(12) United States Patent
Britton et al.

(10) Patent No.: US 6,929,274 B2
(45) Date of Patent: *Aug. 16, 2005

(54) BICYCLE TRAILER HITCH

(75) Inventors: Daniel William Britton, Calgary (CA); Imad Assaf, Calgary (CA)

(73) Assignee: 634182 Alberta Ltd., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/704,148

(22) Filed: Nov. 10, 2003

(65) Prior Publication Data

US 2004/0173988 A1 Sep. 9, 2004

Related U.S. Application Data

(63) Continuation-in-part of application No. 09/964,884, filed on Sep. 28, 2001, now Pat. No. 6,663,126.

(51) Int. Cl.[7] .................................................. B62J 7/04
(52) U.S. Cl. ........................ 280/204; 280/503; 224/422
(58) Field of Search ................................. 280/204, 292, 280/293, 295, 288.4, 304, 503; 224/426, 425, 419, 422, 429, 447, 449, 450

(56) References Cited

U.S. PATENT DOCUMENTS

| RE26,806 E | 3/1970 | Robinson |
|---|---|---|
| 3,567,249 A | 3/1971 | Robinson |
| 3,993,320 A | 11/1976 | Robinson |
| 4,381,117 A | 4/1983 | French et al. |
| 5,171,034 A | 12/1992 | Scott |
| 5,267,744 A | 12/1993 | Berry et al. |
| 5,474,316 A | 12/1995 | Britton |
| 5,516,131 A | 5/1996 | Novotny |
| 6,050,581 A | 4/2000 | Everett |
| 6,056,306 A | 5/2000 | Rust et al. |
| 6,099,008 A | 8/2000 | Caffey |
| 6,099,011 A | 8/2000 | Beaudoin et al. |
| 6,305,703 B1 | 10/2001 | Quick et al. |
| 6,443,472 B1 | 9/2002 | Kahmann |

OTHER PUBLICATIONS

Freedom in Motion! 2001 Product Guide; Chariot Carriers Inc.; www.chariotcarriers.com.

*Primary Examiner*—Tony Winner
(74) *Attorney, Agent, or Firm*—Bennett Jones LLP

(57) ABSTRACT

A bicycle trailer hitch for securing a trailer to a bicycle, the trailer including a hitch arm and the bicycle having a rear wheel including an axle with an axis of rotation and a frame, the bicycle trailer hitch comprising: a hitch ball including a base end connectable to the trailer hitch arm, an opposite end formed as a ball end and a intermediate portion extending therebetween; and a bicycle-mounted hitch portion mountable on the bicycle and including a socket formed to removably retain the ball end of the hitch ball, the socket including an open end, sized to permit the ball end of the hitch ball to pass therethrough and a retainer end formed to retain the ball end therein, the open end being positioned at the forward end of the socket and the retainer end positioned at the rear of the socket such that the ball end is retained in the retainer end when the hitch arm of the trailer is extending out from the hitch behind the bicycle.

19 Claims, 5 Drawing Sheets

BICYCLE TRAILER HITCH

CROSS REFERENCE TO RELATED APPLICATIONS

This application is a continuation-in-part of U.S. Ser. No. 09/964,884, filed Sep. 28, 2001, now U.S. Pat. No. 6,663,126, issued Dec. 16, 2003.

FIELD OF THE INVENTION

The invention relates to a bicycle trailer and, in particular, to a bicycle trailer hitch for connecting a bicycle trailer to a bicycle.

BACKGROUND OF THE INVENTION

Bicycle trailers have become quite popular for carrying children and cargo. The bicycle trailers are hitched to the rear of the bicycle and towed therebehind.

Most previous hitches are connectable to the chain stay or to both the chain stay and the seat stay of the bicycle to retain the hitch arm of the trailer. Recently hitches have been introduced that secure into the rear axle of the bicycle. One such hitch is described in U.S. Pat. No. 6,099,008 to Caffey.

Many hitches include complex arrangements for connection between the hitch arm and the hitch. In particular, the connection arrangements include pins that are passed through alignable apertures in the hitch arm and in the bracket that is attached to the bicycle. This procedure can be frustrating, as the trailer can be difficult to maneuver when grasping the end of the hitch arm.

In addition, previous hitches sometimes include complex universal joint arrangements including many interconnected parts and bearings. This increases the cost of the hitch to consumers.

SUMMARY OF THE INVENTION

A bicycle trailer hitch according to the present invention connects to a bicycle. The hitch securely and effectively hitches a trailer to a bicycle, but is simple to use. The hitch is also economical to manufacture and therefore can be offered to consumers at low price.

In accordance with a broad aspect of the present invention, there is provided a bicycle trailer hitch for securing a trailer to a bicycle, the trailer including a hitch arm and the bicycle having a frame and a rear wheel including an axle with an axis of rotation, the bicycle trailer hitch comprising: a hitch ball including a base end connectable to the trailer hitch arm, an opposite end formed as a ball end and an intermediate portion extending therebetween; and a bicycle-mounted hitch portion mountable on the bicycle and including a socket formed to removably retain the ball end of the hitch ball, the socket including an open end, sized to permit the ball end of the hitch ball to pass therethrough and a retainer end formed to retain the ball end therein, the open end being positioned at the forward end of the socket and the retainer end positioned at the rear of the socket such that the ball end is retained in the retainer end when the hitch arm of the trailer is extending out from the hitch behind the bicycle.

The hitch ball base end can be formed to be releasably connected, as by pinning, to the hitch arm. In one embodiment, the base end is an insert sized to fit into the hollow end of the hitch arm, which is formed of tubing. The base end can alternately, for example, be a cup sized to fit over the outboard end of the hitch arm. A pin, threaded bolt, etc. can be pinned through the insert or cup and the hitch arm.

The hitch ball base end can be formed integral with the ball end. An intermediate portion extends between the ball end and the base end. The intermediate portion is reduced in diameter relative to the ball end and extends out from the socket while the ball end is retained therein. The intermediate portion can be formed of a resilient material to permit some flexion between the base end and the ball end.

The bicycle mounted hitch portion includes a socket for engaging the hitch ball and is mountable to the bicycle to support the socket on the bicycle.

The socket can be formed to closely surround and correspond with the shape of the ball end of the hitch ball. Alternately, the socket can be formed to simply retain the ball end therein without consideration as to the shape of the ball head. Of course, when the socket is formed to closely surround and correspond with the shape of the ball end, this offers more even wear between the ball and the socket and more favourable transfer of forces within the hitch.

The socket includes an open end, sized to permit the ball end of the hitch ball to pass therethrough, and a retainer end. In one embodiment, the open end includes a closure mechanism, such as for example a removable pin, a releasable catch or a latchable gate, such that the open end can also act to retain the ball end in the socket. Where a pin is used, it can be arranged to fit through the socket and block the opening, thereby avoiding the problems of having to align apertures between the hitch ball and the socket. A slot is provided between the open end and the retainer end and sized to permit the intermediate portion of the hitch ball to slide therein while the ball is retained in the socket. The slot can be positioned to open at a side of the socket facing away from the bicycle.

Applied force, for example of the hitch arm pulling on the bicycle mounted hitch portion can urge the bicycle mounted hitch portion to be dislodged, loosened or to pivot out of its mounted position. As such, the retainer end can be arranged on the bicycle-mounted hitch portion such that when the ball end is seated in the retainer end, the ball end's axis of rotation within the retainer end is substantially aligned, either laterally or vertically, with the bicycle-mounted hitch portion's center of rotation.

The bicycle mounted hitch portion can include a connector through which it is mountable onto the bicycle. The connector can support the socket of the bicycle-mounted hitch portion, which can be connected to or formed integral with the connector.

The connector of the bicycle mounted hitch portion can be selected for connection to any of various parts of the bicycle including, for example, one or more of the axle of the rear wheel, the seat post or the frame including for example, the chain stay, the seat stay or the rear wheel drop out. The connector can employ clamping, bolting, strapping, brackets or other connection mechanisms, as desired. Examples of connectors for connecting a hitch to a bicycle are shown, in the aforementioned patent of Caffey, and in U.S. Pat. No. 5,474,316 of Britton, U.S. Pat. No. 4,381,117 of French et al., U.S. Pat. No. 5,516,131 of Novotny and many others. Many other connectors for connecting the bicycle-mounted hitch portion to a bicycle will be apparent to a skilled person.

The connector of the bicycle-mounted hitch portion can, in on embodiment, be mounted between an end of the axle and the frame of the bicycle to which the rear wheel is mounted. The connector can include a plate with an aperture, through which the axle can extend. The plate can be restrained, as by tight clamping, from pivoting about the axle. Clamping can be provided by a quick release mechanism or by a fastener secured onto the axle. The plate aperture can extend through the plate such that, when the bicycle-mounted hitch portion is mounted to the axle, the plate extends substantially orthogonal to the axle axis of rotation, with the socket spaced from the aperture. This provides that the standard axle securing means, such as a fastener or quick release mechanism can be clamped against the plate without modifying the standard axle mounted arrangement of the bicycle.

BRIEF DESCRIPTION OF THE DRAWINGS

A further, detailed, description of the invention, briefly described above, will follow by reference to the following drawings of specific embodiments of the invention. These drawings depict only typical embodiments of the invention and are therefore not to be considered limiting of its scope. In the drawings.

DETAILED DESCRIPTION OF THE PREFERRED EMBODIMENTS

Figure 1:
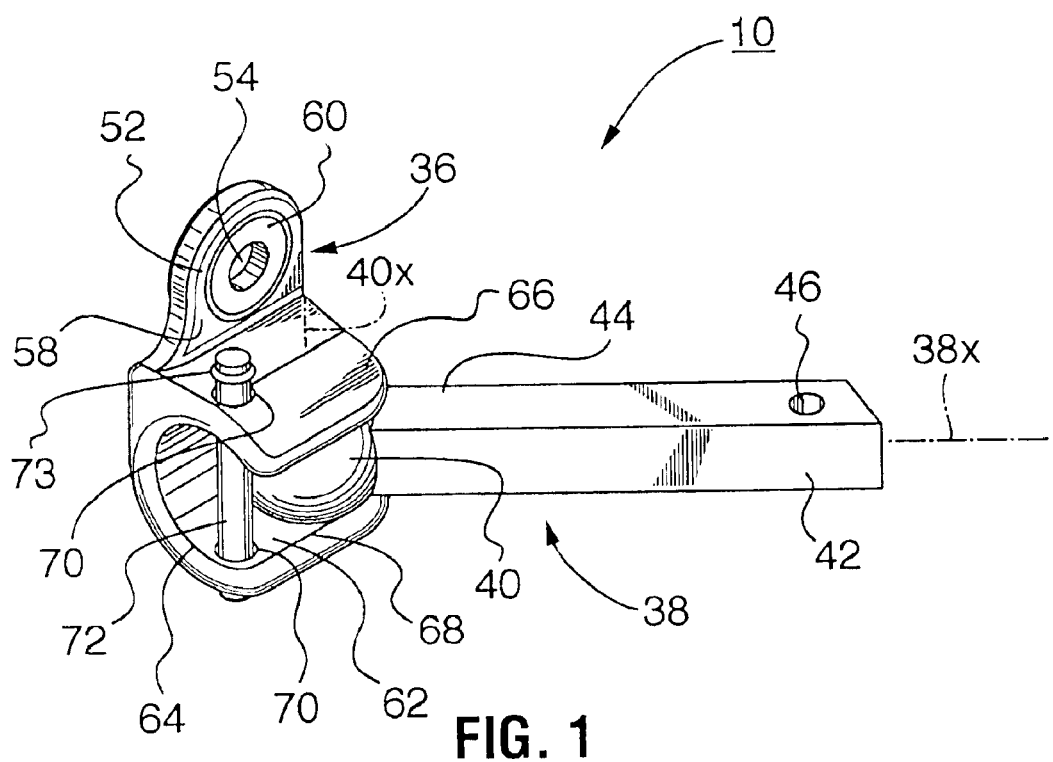
FIG. 1 is a perspective view of a bicycle trailer hitch.

Referring to FIGS. 1 to 4, a bicycle trailer hitch 10 is shown. The bicycle trailer hitch 10 is intended for use in securing a trailer (not shown) having a trailer hitch arm 12 to a bicycle. A trailer, which incorporates a hitch arm, is shown, for example, in the aforementioned patent to Britton.

A bicycle on which the hitch is to be used includes a frame, partially shown at 18, which can have a rear triangle including a pair of horizontal chain stays 20 and a pair of slanted, upwardly extending seat stays 22. The stays on each side can be joined at the rear of the frame to a rear wheel mounting bracket, termed a "drop-out" 24, which mounts a rear wheel 26 (partially shown and shown without gear sprockets) to the frame. While a standard bicycle frame is shown, the hitch of the present invention is also useful with other frame arrangements, for example, those without chain stays such as rear suspension bicycles. It is to be understood that while an axle-mounted type hitch is shown, the bicycle mounted hitch portion can be mounted in other ways to the bicycle for example to the stays of the frame, the seat post, etc. Mounting can be by clamping, strapping, bracketing, bolting etc., as desired. The bicycle-mounted hitch portion can include connectors operating on any of these mechanisms.

For a better understanding of an axle-mounted connector, an axle is illustrated. Rear wheel 26 includes a hub 27 through which a rear axle 16 extends. Rear axle 16 defines an axis of rotation, indicated at 16x. In the embodiment of FIGS. 1 to 4, rear axle 16 is of the quick-release type. In a quick-release mechanism, axle 16 includes an axle skewer 28 secured at one end through a quick-release nut 29 and at the other end through an eccentric lever 30 and a washer 31 against which the eccentric lever bears. The operation of a quick-release axle is well known in the art. In particular, by driving eccentric lever 30 to move washer 31 along the skewer the wheel hub and drop-outs 24 are clamped between the quick-release nut and washer 31.

Hitch 10 includes a bicycle-mounted hitch portion 36 and a hitch ball 38. Hitch ball 38 is connectable to the hitch arm of a bicycle trailer. Hitch ball 38 includes a ball end 40, a base end 42 and an intermediate portion 44 extending therebetween. Ball end 40 is generally spherically shaped and has a diameter d larger than the width of intermediate portion 44. Base end 42 is selected to be connectable to hitch arm 12. In particular, base end 42 in the illustrated embodiment is shaped and sized to be insertable into the hollow tube which forms hitch arm 12. The base end can be shaped and sized to fit closely within the hitch arm. An aperture 46 extends through base end 42 and is alignable with a pair of apertures (cannot be seen in the drawings) on hitch arm 12. A fastener such as the illustrated bolt 50 and nut 51 can be secured through aperture 46 and those apertures on the hitch arm, once they are aligned, to connect the hitch ball to the hitch arm of the trailer. When installed on a hitch arm, ball end 40 and intermediate portion 44 of the hitch ball extend out from the end of the hitch arm.

Bicycle-mounted hitch portion 36 in the illustrated embodiment is axle-mounted and can include a plate 52 with an aperture 54 extending therethrough. Plate 52 includes an inner face 56 and an outer face 58. Inner face 56 and outer face 58 are disposed in parallel planes and aperture 54 extends orthogonal to the planes of faces 56 and 58. When mounted on a bicycle inner face 56 engages against drop-out 24 and washer 31 of quick-release mechanism engages against outer face 58 while axle 16 extends through aperture 54. Aperture 54 is sized to permit the axle to pass therethrough and rotate therein. In a preferred embodiment, as shown, a circular indentation 60 is formed on the outer face about aperture 54. Circular indentation 60 causes washer 31 and thereby axle 16 to be centered relative to aperture 54.

It can be useful to provide a hitch that works with standard axle arrangements. In the illustrated embodiment, the aperture extends through the plate such that when the bicycle-mounted hitch portion is mounted to the axle, the plate extends substantially orthogonal to the axle axis of rotation. This provides that the standard axle securing means, such as a fastener or the lever 30 and washer 31 of the quick release mechanism can be clamped against the plate without modifying the standard axle mounted arrangement of the bicycle.

Bicycle-mounted hitch portion 36 also includes a socket 62 rigidly connected to plate 52. Socket 62 includes an open end 64 and a retainer end 66. The socket is formed with consideration as to the diameter d of the ball end of hitch ball 38 such that the ball end can fit through open end 64 and seat within retainer end 66. The retainer end is formed to generally support and permit rotation therein of ball end 40, as limited by abutment of intermediate portion 44 against the socket material. A slot 68 is formed between open end 64 and retainer end 66. Slot 68 is formed to permit movement of hitch ball intermediate portion 44 therealong while blocking passage therethrough of ball end 40. In the illustrated embodiment, retainer end 66 is formed at the rear end of the socket. In this way, when trailer is being towed behind the bicycle, ball end 40 is securely seated in retainer end 66. Bicycle mounted hitch portion generally includes an inner facing side, for example, including inner face 56, which faces the bicycle and slot 68 can extend about the side of the socket, opposite inner facing side, such that ball end 40 rotates within the socket mainly about an axis 40x generally perpendicular to the long axis 38x, extending between the ball end and the base end of hitch ball 38. This permits hitch arm to rotate laterally and rearwardly outwardly relative to the bicycle-mounted hitch portion 36 when it is mounted on the rear axle of a bicycle.

Figure 3:
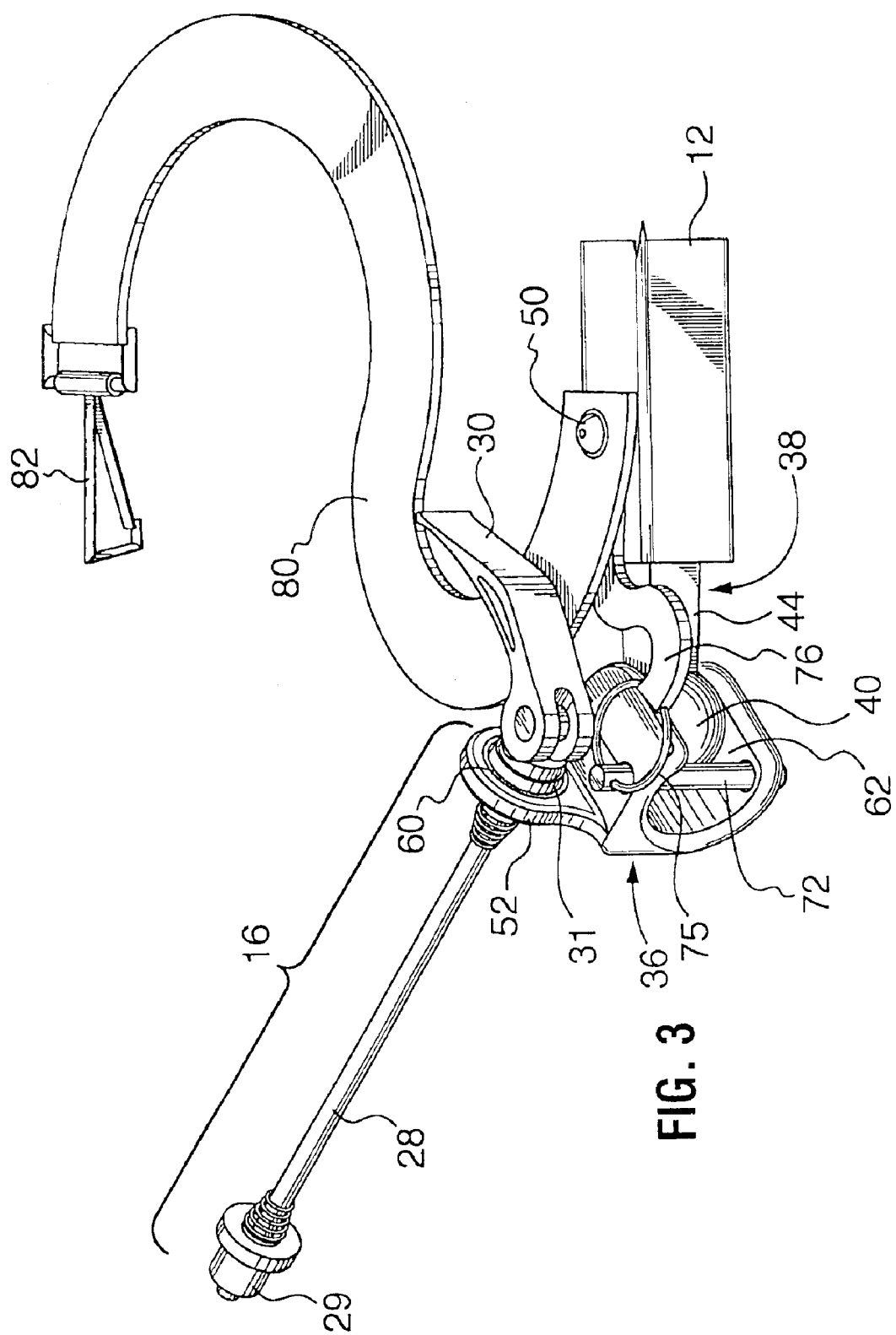
FIG. 3 is a perspective view of a bicycle trailer hitch invention with a quick release axle mechanism installed therein.
Figure 4:
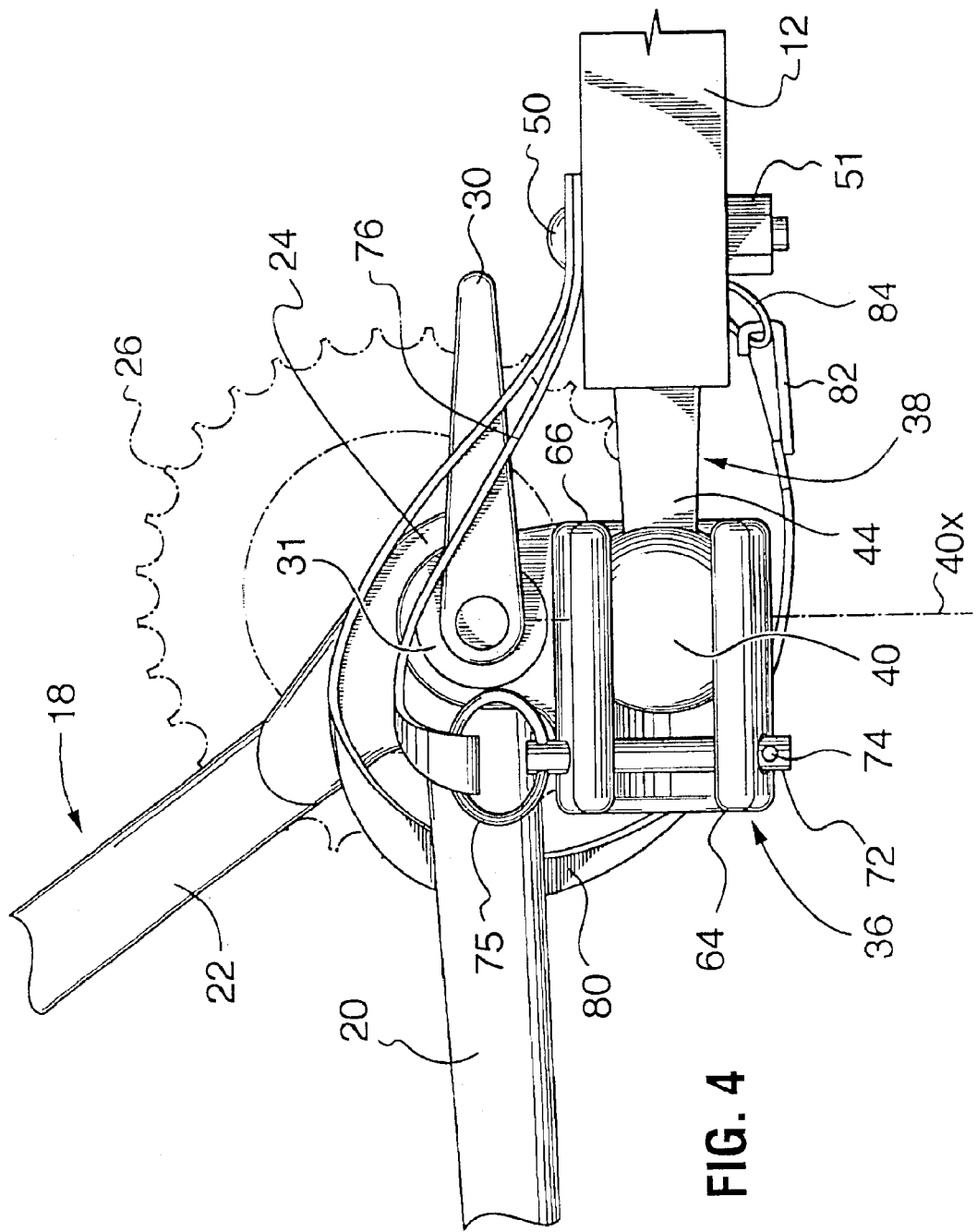
FIG. 4 is a side elevation view of a bicycle trailer hitch of FIG. 3 mounted on the rear triangle of the bicycle with the hitch ball in the socket; and, FIG. 5 is a front elevation view of the bicycle trailer hitch of FIG. 2 installed using another means onto an axle of a bicycle.

To retain hitch ball 38 within the socket, a closure mechanism is provided adjacent open end 64. While other closure mechanisms can be used, in the illustrated embodiment of FIG. 1, a pair of aligned apertures 70 is formed adjacent open end 64, which accept and retain a pin fastener 72 therein. Pin fastener 72 can include various releasable locking means for securing within aperture 70. In the illustrated embodiment, pin 72 includes an enlargement such as, for example, enlarged portion 73 (FIG. 1) or ring 75 (FIG. 3), at one end and a spring biased detent ball 74 at the other end. In the embodiment of FIG. 3, to prevent loss of pin 72 when the pin is not in use in the apertures, a strap 76 can be secured at its first end to the pin and to another position, such as to hitch arm 12, at its opposite end. Apertures 70 can be positioned on the socket with consideration of the diameter d of ball end 40 such that when pin 72 is inserted into the apertures, ball end 40 is held closely between pin 72 and the retainer end of socket 62. This reduces rattling noises arising from the ball head moving within the socket and reduces damage to the ball end and the socket by vibrational wear.

Figure 2:
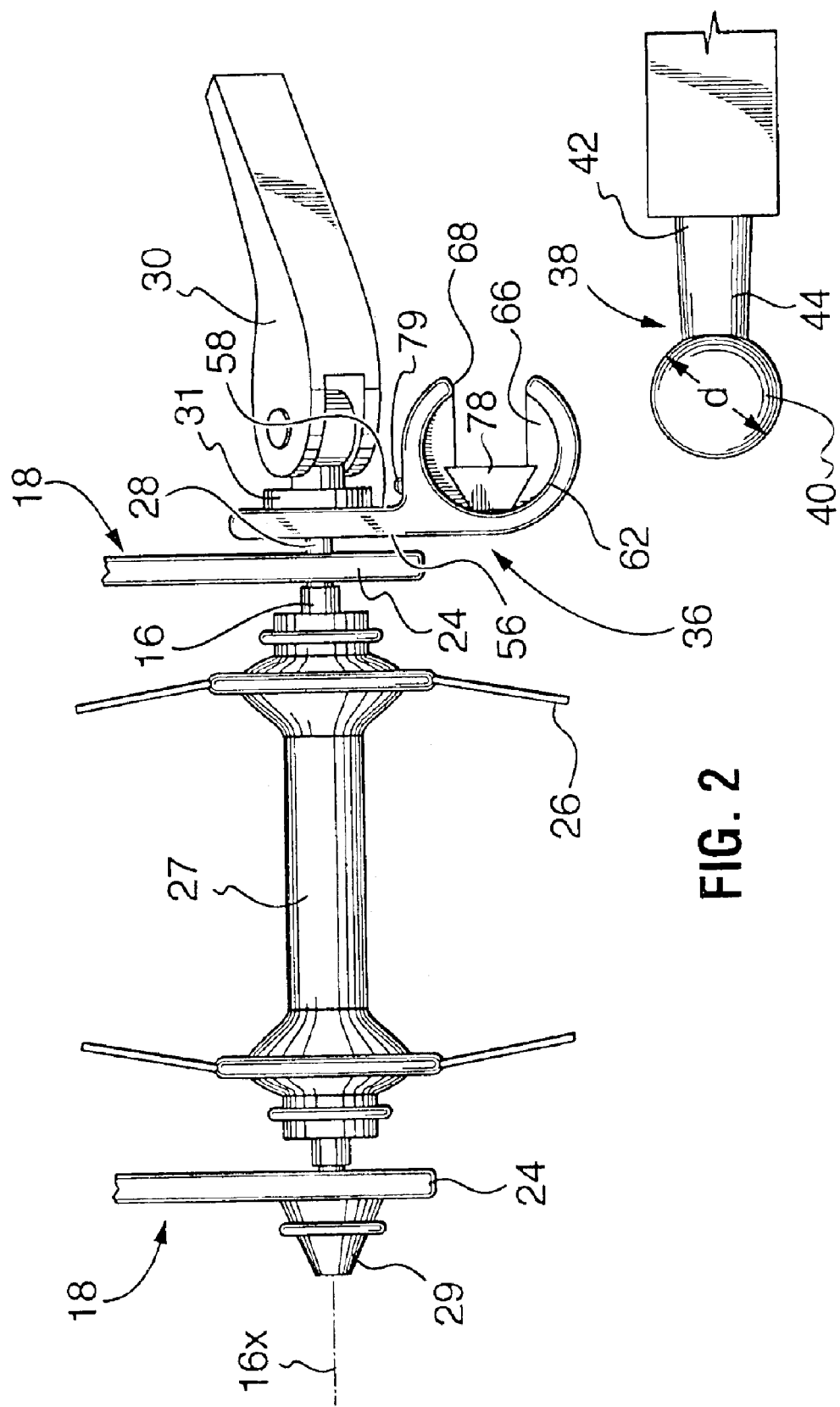
FIG. 2 is a front elevation view of a bicycle trailer hitch with a hitch ball aligned for entry into the socket and mounted on an axle of a bicycle.

In another embodiment illustrated in FIG. 2, the closure mechanism is a closeable gate 78 mounted adjacent the open end. Gate 78 is mounted on a hinge, which permits the gate to swing inwardly to allow the ball end to pass into the socket but which is locked against swinging outwardly toward the open end unless button 79 is pressed when pressure is applied outwardly to the gate. Thus, gate 78 locks ball end 40 into the socket until released by pressing button 79.

Bicycle-mounted hitch portion 36 can be formed compact to reduce its effect on the appearance, size, etc. of the bicycle and/or to reduce its tendency to be affected by torque. For example, socket 62 can be positioned as close as possible to aperture 54 without blocking access to the aperture and without limiting access to the socket by the hitch ball. With consideration to size, torque reduction and ease of use, the socket can be offset from the aperture and spaced below it, as determined by gravity when portion 36 is mounted on the bicycle axle, and the retainer end 66 of the socket can be positioned relative to aperture 54 such that when the ball end of the hitch ball is seated in retainer end 66, axis 40x of ball end 40 is aligned with aperture 54, which is the center of rotation of the connector.

Applied force, for example of the hitch arm pulling on the socket, will urge bicycle-mounted hitch portion 36 to pivot relative to its point of connection on the bicycle. To act against such pivotal movement, for example in an axle-mounted connector, inner face 56 can be knurled or otherwise roughened to enhance engagement of the bicycle-mounted hitch portion against the drop-out of the bicycle against which it is engaged.

A safety strap 80 can be used in connection with hitch 10 to prevent separation of the trailer from the bicycle in the event that any part of the hitch should come loose. Strap 80 can be secured to hitch arm 12 by bolt 50 and includes a clip 82 at its loose end for connection to a D-ring 84 also secured to bolt 50. Strap 80 can be extended about chain stay 18, seat stay 20 or the axle and clipped onto D-ring 84 when a trailer is secured to the bicycle.

It will be appreciated from the foregoing description that hitch arm 12 is free to rotate about axis 40x through a significant arc. Pitch and roll of the hitch arm relative to socket 62 can be permitted by selecting the thickness of intermediate portion 44 to be less than the width of slot 68. Alternately or in addition, intermediate portion 44 can be formed of a resilient material permitting some flex between ball end 40 and base end 42 of the hitch ball. In one embodiment, hitch ball 38 is formed entirely of a resilient material such as a polymeric material, for example polyurethane, which permits flex in intermediate portion 44. The resilient material can permit some flex in the hitch ball, but is not so flexible as to create a sloppy connection between the trailer and the bicycle.

Bicycle-mounted hitch portion 36 can be formed of various materials, as will be appreciated. In one embodiment, a durable, rigid material, such as for example a polymer or metal, can be used. The use of a castable material, such as an aluminum/zinc alloy, can facilitate manufacture.

Bicycle trailer hitch 10 is relatively easy to manufacture and can be installed on a bicycle and trailer simply and effectively. Attachment of an axle-mounted hitch, for example, can be by a quick-release axle 16 including a skewer 28, eccentric lever 30 and washer 31, as illustrated in FIGS. 1 to 4. The bicycle-mounted hitch portion and hitch ball can be sold with or without a quick-release axle mechanism. In some applications, the existing quick-release axle on the bicycle can be used to secure the bicycle-mounted hitch portion. Alternately, it may be useful to provide a replacement quick-release axle which includes a skewer selected to have a length to accommodate the bicycle-mounted hitch portion thereon and a construction to withstand the torque which may be applied to the axle.

Figure 5:
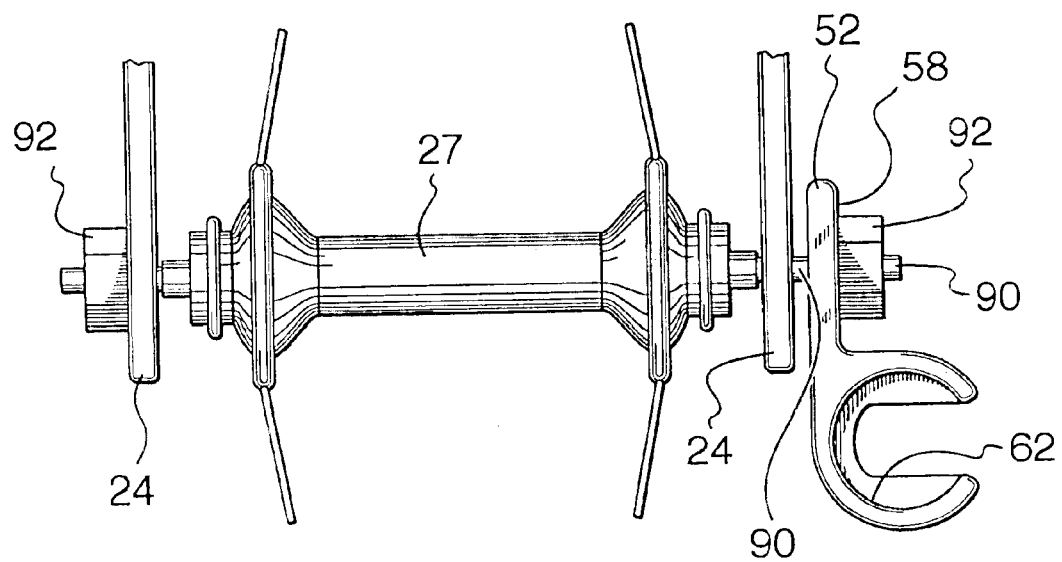

In another axle-mounted embodiment illustrated in FIG. 5, the bicycle-mounted hitch portion of the present invention is mounted to the rear axle by a non-quick-release rear wheel mounting. In such a mounting arrangement an axle 90 extends through the hub 27 of the rear wheel and is engaged against the drop-outs 24 of the bicycle by nuts 92. The bicycle-mounted hitch portion 36 of the present hitch can be used in unmodified form relative to that of FIGS. 1 to 4 with such an axle mounting arrangement. In particular, nut 92 on one side of the axle can be secured against outer face 58 of the plate 52. Again, socket 62 is provided adjacent to the aperture in the plate, but does not block access to it or to nut 92.

As will be appreciated from the foregoing in order to use the trailer hitch of the present invention, bicycle-mounted hitch portion 36 is mounted onto a bicycle and hitch ball 38 is mounted onto a hitch arm 12 of a bicycle trailer. In particular, base end 42 of the hitch ball is inserted into the hollow end of hitch arm 12. Aperture 46 of base end 42 is aligned with the hitch arm aperture 48 and bolt 50, or other fastener, is inserted therethrough. Straps 76 and 80 are secured by bolt 50.

To install the illustrated axle-mount version of bicycle-mounted hitch portion 36 of the hitch, it is necessary to remove the original quick-release mechanism from the rear wheel of the bicycle. This is done by removing the quick-release nut and associated springs and removing the skewer from the hub. As noted previously, bicycle-mounted hitch portion 36 can be used with an existing quick-release mechanism or with a quick-release mechanism provided with a selected skewer. In any event, in order to mount the bicycle-mounted hitch portion onto the rear axle, skewer 28 of the axle is inserted through aperture 54 so that outer face 58 faces eccentric lever 30. Skewer 28 is then inserted through the hub of the rear wheel and quick-release nut 29 and associated springs are secured at the end of the skewer and bicycle-mounted hitch portion 36 is disposed on the lever side of the axle. The rear wheel with axle 16 and bicycle-mounted hitch portion 36 attached is then installed on drop-outs 24 of the bicycle frame, such that inner face 56 engages against drop-out 24 on the lever side of the quick-release axle. Generally, it is desirable to mount the hitch on the side of the wheel opposite the gear sprockets. However, the hitch can be mounted on the other side if required. Quick-release nut is then adjusted so that eccentric lever can be clamped down against washer 31 to clamp the wheel onto the drop-outs. If a non-quick release axle is used such as that of FIG. 5, the nuts 92 are used to clamp the wheel and the bicycle-mounted hitch portion onto the bicycle frame.

If a connector is used that is fixable to another (non-axle) part of the bicycle, that connector can be clamped, fastened, strapped, etc., in accordance with the operation of the connector, to the bicycle. Again, generally the mount can be out of the way of the chain and gears.

The bicycle-mounted hitch portion 36 can be mounted so that socket 62 is positioned below, with respect to the normal operational orientation of a bicycle, the connector with open end 64 of the socket facing toward the front of the bicycle.

The hitch arm with hitch ball 38 attached is then brought towards the socket and inserted into the open end thereof. The ball end is moved into the socket until it seats against retainer end 66. Pin 72 is then inserted into apertures 70 until detent 74 locks under the socket. Ball end 40 is then captured in the socket. Strap 80 can then be wrapped around the frame and clip 82 engaged to ring 84. The trailer can, in this way, be secured to the bicycle and ready for use.

It will be apparent that many other changes may be made to the illustrative embodiments, while falling within the scope of the invention and it is intended that all such changes be covered by the claims appended hereto.

The embodiments of the invention in which an exclusive property or privilege is claimed are defined as follows:

1. A bicycle trailer hitch for securing a trailer to a bicycle, the trailer including a hitch arm and the bicycle having a frame and a rear wheel including an axle with an axis of rotation, the bicycle trailer hitch comprising: a hitch ball including a base end connectable to the trailer hitch arm, an opposite end formed as a ball end and an intermediate portion extending therebetween; and a bicycle-mounted hitch portion mountable on the bicycle and including a socket formed to removably retain the ball end of the hitch ball, the socket including an open end, sized to permit the ball end of the hitch ball to pass therethrough and a retainer end formed to retain the ball end therein, the open end being positioned at the forward end of the socket and the retainer end positioned at the rear of the socket such that the ball end is retained in the retainer end when the hitch arm of the trailer is extending out from the hitch behind the bicycle.

2. The bicycle trailer hitch of claim 1 wherein the intermediate portion is formed of a resilient material to permit some flexion between the base end and the ball end.

3. The bicycle trailer hitch of claim 2, wherein the intermediate portion is formed of polyurethane.

4. The bicycle trailer hitch of claim 2, wherein the hitch ball is formed of polyurethane.

5. The bicycle trailer hitch of claim 1, the socket further including a closure mechanism at the open end to close the open end.

6. The bicycle trailer hitch of claim 1 wherein the trailer hitch arm is formed as a tube including a hollow end and wherein the base end is formed as an insert sized to fit into and be engaged in the hollow end of the hitch arm.

7. The bicycle trailer hitch of claim 1 wherein the ball end and the base end are aligned along a long axis of the hitch ball and the hitch ball is selected to extend out from the hitch arm with its long axis substantially in line with the long axis of the hitch arm.

8. The bicycle trailer hitch of claim 1 further comprising a strap connectable to the hitch ball and extendable to engage about the bicycle.

9. The bicycle trailer hitch of claim 1 the bicycle-mounted hitch portion including an inner facing side, oriented toward the bicycle when mounted on a bicycle, and the socket further including a slot extending between the open end and the retainer end, the slot being positioned at a side of the socket facing outwardly from the inner facing side and being formed to permit movement of the intermediate portion therealong, while blocking the passage therethrough of the ball end.

10. The bicycle trailer hitch of claim 9 wherein the slot extends about the rear of the socket.

11. The bicycle trailer hitch of claim 9 wherein the slot includes a width larger than the thickness of the intermediate portion.

12. The bicycle trailer hitch of claim 9, wherein the retainer end is positioned relative to the bicycle-mounted hitch portion such that when the ball end is seated in the retainer end, the ball end's axis of rotation within the retainer end is substantially aligned with the bicycle-mounted hitch portion's center of rotation.

13. The bicycle trailer hitch of claim 5, wherein the closure mechanism is positioned relative to the retainer end to hold the ball end securely between the closure mechanism and the retainer end, when the ball end is positioned in the socket.

14. The bicycle trailer hitch of claim 5 wherein the closure mechanism is a pin and the socket further includes pin-retaining holes and the pin-retaining holes are spaced from the retainer end, with consideration as to the ball end's diameter, such that the ball end is held closely between the retainer end and the pin, when the ball end is positioned in the retainer end and the pin is extended through its pin-retaining holes.

15. The bicycle trailer hitch of claim 1, the bicycle-mounted hitch portion further including a connector supporting the socket and through which the bicycle-mounted hitch portion is mountable to the bicycle.

16. The bicycle trailer hitch of claim 15 wherein the connector is mountable to the bicycle by bolting.

17. The bicycle trailer hitch of claim 15 wherein the connector is clampable to the bicycle.

18. The bicycle trailer hitch of claim 15 wherein the connector is clampable against the bicycle frame.

19. The bicycle trailer hitch of claim 1 wherein the connector is a plate including an aperture, the plate being mountable on the axle of the rear wheel of the bicycle with the axle extending through and rotatable within the aperture.

* * * * *